United States Patent [19]

Musselman et al.

[11] Patent Number: 4,711,673

[45] Date of Patent: Dec. 8, 1987

[54] COMBINATION OF SURFACE MODIFIERS FOR POWDERED INORGANIC FILLERS

[75] Inventors: Lawrence L. Musselman, Apollo; Thomas L. Levendusky, Greensburg, both of Pa.

[73] Assignee: Aluminum Company of America, Pittsburgh, Pa.

[21] Appl. No.: 783,863

[22] Filed: Oct. 3, 1985

[51] Int. Cl.$^4$ .................. C08K 9/04; C08K 9/06; C08K 9/00

[52] U.S. Cl. .................. 106/287.17; 106/287.15; 106/288 B; 106/289; 106/291; 106/304; 106/308 Q; 106/308 F; 106/308 N; 523/203; 523/212; 523/213

[58] Field of Search .............. 106/287.15, 287.17, 106/288 B, 289, 291, 304, 308, 308 N, 308 F; 523/203, 212, 213

[56] References Cited

U.S. PATENT DOCUMENTS

| | | | |
|---|---|---|---|
| 3,647,742 | 3/1972 | Stevens | 523/213 |
| 3,833,534 | 9/1974 | Tierney et al. | 523/213 |
| 3,843,591 | 10/1974 | Hedrick et al. | 523/213 |
| 4,105,465 | 8/1978 | Berger | 106/308 Q |
| 4,131,589 | 12/1978 | Smith | 260/37 SB |
| 4,131,591 | 12/1978 | MacFarlane | 523/213 |
| 4,136,080 | 1/1979 | Berger | 523/203 |
| 4,162,245 | 7/1979 | Collins et al. | 523/514 |
| 4,218,360 | 8/1980 | Burhans et al. | 260/37 EP |
| 4,222,915 | 9/1980 | Wolff et al. | 524/574 |
| 4,283,316 | 8/1981 | Bonsignore | 260/23 XA |
| 4,369,605 | 9/1982 | Biggs et al. | 524/563 |
| 4,390,653 | 6/1983 | Levendusky et al. | 524/322 |
| 4,399,246 | 8/1983 | Hyde | 524/169 |

FOREIGN PATENT DOCUMENTS

| | | | |
|---|---|---|---|
| 0158648 | 12/1975 | Japan | 524/606 |
| 0117948 | 10/1977 | Japan | . |
| 0172941 | 10/1982 | Japan | 523/203 |
| 0047061 | 3/1985 | Japan | 523/203 |

OTHER PUBLICATIONS

Derwent Abs, 07082, D/05, SU-735613, (5-1980).
Derwent Abs, C85-085141, J60123515, (7-1985).

Primary Examiner—Herbert J. Lilling
Attorney, Agent, or Firm—Glenn E. Klepac

[57] ABSTRACT

A filler composition containing at least two surface modifiers and comprising a powdered inorganic filler, a carboxylic acid or mixture of carboxylic acids and an organosilane. A preferred filler composition comprises alumina trihydrate, isostearic acid and vinyl-tris (2-methoxyethoxy) silane. When filler compositions containing both the carboxylic acid and organosilane surface modifiers are blended with thermoplastic resins to form thermoplastic compounds, the resulting filled compounds display improved physical properties compared with controls.

9 Claims, 1 Drawing Figure

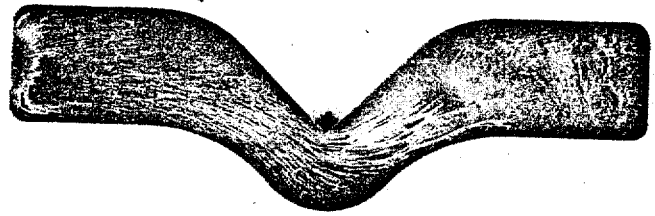
PRIOR ART

COMBINATION OF SURFACE MODIFIERS FOR POWDERED INORGANIC FILLERS

REFERENCE TO RELATED APPLICATION

This application is related to Musselman et al U.S. Ser. No. 598,217, filed Apr. 9, 1984 (abandoned).

BACKGROUND OF THE INVENTION

This invention is concerned with surface treated inorganic fillers. More specifically, the invention relates to powdered inorganic fillers containing on their surfaces a combination of carboxylic acids and organosilanes to make the fillers more compatible with thermoplastic resins and to improve properties of thermoplastic compounds made by combining the treated fillers with thermoplastic resins. Filler compositions containing the claimed combination of surface modifiers surprisingly have been found to minimize mold flow lines in injection molded thermoplastic compounds manufactured by blending the compositions with thermoplastic resins.

Surface treated inorganic filler compositions and thermoplastic compounds made with such filler compositions are known in the prior art. However, there is a continuing need to improve the properties of such compositions and compounds and to facilitate their manufacture.

Two prior art patents disclosing alumina hydrate compositions surface modified with carboxylic acids are Bonsignore U.S. Pat. No. 4,283,316 and Levendusky et al U.S. Pat. No. 4,390,653. Surface modification of inorganic fillers with various organosilane compounds is disclosed in Berger U.S. Pat. No. 4,105,465; Smith, Jr. U.S. Pat. No. 4,131,589 and Burhans et al U.S. Pat. No. 4,218,360. None of the patents listed above suggests any combination of carboxylic acid and organosilane surface modifiers for powdered inorganic fillers.

It is a principal object of the present invention to provide a powdered inorganic filler with a surface coating that will cause filled thermoplastic compounds made with the filler to display an improved appearance compared with controls.

A related object of the invention is to provide a surface modified filler composition that exhibits satisfactory processing characteristics and does not impair physical properties when mixed with thermoplastic resins to form filled thermoplastic compounds.

Additional objects and advantages of the present invention will become apparent to persons skilled in the art from the following specification.

SUMMARY OF THE INVENTION

In accordance with the present invention, a powdered inorganic filler is combined with about 0.5 to 5%, based on the weight of the filler, of surface modifiers for the filler. The powdered filler is selected from the group consisting of alumina hydrate, bauxite, hydrated magnesia, hydrated calcium silicate, kaolin, mica, talc and silica. The powdered filler has an average particle size less than about 15 microns.

A preferred filler is alumina hydrate having a median particle size of less than about five microns, more preferably less than about two microns. Alumina trihydrate having a nominal particle size of about one micron is particularly preferred. A preferred alumina trihydrate is sold by Aluminum Company of America, Pittsburgh, Pa. under the trade name "Hydral 710".

The expression "alumina hydrate" refers to $Al_2O_3 \cdot x H_2O$, wherein x varies from 1 to 3; in other words, the water of the alumina hydrate varies from 15.0 to 34.6 percent by weight of the alumina hydrate, determined by calcination at 538° C. (1000° F.) for one hour. Alumina hydrate which is modified according to the invention can be obtained from many sources, most commonly as a product of the Bayer process.

The filler composition of the invention is made with at least two different surface modifiers, comprising a carboxylic acid or mixture of carboxylic acids and an organosilane. The carboxylic acid component preferably comprises a liquid mixture of $C_{10}$–$C_{20}$ saturated carboxylic acids, with $C_{16}$–$C_{20}$ saturated acids being more preferred. The liquid mixture has a titer (congealing temperature) below about 30° C., preferably below about 20° C. Mixtures of saturated acids having an iodine value of about 15 or less, and preferably about 12 or less, are preferred. A particularly preferred fatty acid mixture has an iodine value of about three or less and is sold under the designation "isostearic acid". This mixture comprises saturated, mostly $C_{18}$ carboxylic acids and has a titer of about 8° to 10° C.

A surface modified alumina hydrate composition made in accordance with the invention preferably contains about 0.25 to 2.5% isostearic acid, based on the weight of the hydrate. A particularly preferred alumina hydrate composition described in the examples contains about 1% isostearic acid.

The organosilane component may be any of several different organosilane compounds. A preferred class of organosilanes has the formula $R_n(SiX_{4-n})_b$, wherein R is selected from the group consisting of alkyl radicals containing 1 to 8 carbon atoms, alkenyl and alkynyl radicals containing 2 to 8 carbon atoms, and phenyl radicals; X is a hydrolyzable group; n=0 or 1; and b is at least 1 and not greater than 4. The organofunctional group is preferably vinyl. Some typical hydrolyzable groups include alkoxy of 1 to 4 carbon atoms, alkoxyalkoxy containing up to about 6 carbon atoms, halogens such as chlorine, fluorine, bromine and iodine, acyloxy of 2 to 4 carbon atoms, phenoxy and oxime. The preferred hydrolyzable groups are alkoxy, alkoxyalkoxy and acyloxy. A particularly preferred organosilane is vinyl-tris (2-methoxyethoxy) silane.

A second class of suitable organosilanes has the general formula $R_1R_2Si(OR_2)_2$ or $R_1Si(OR_2)_3$, wherein $R_1$ is selected from the group consisting of alkyl radicals having 1 to 8 carbon atoms, phenyl radicals, alkenyl radicals having 2 to 8 carbon atoms, and fluoroalkyl radicals having 3 to 8 carbon atoms, and $R_2$ is selected from the group consisting of alkyl radicals having 1 to 8 carbon atoms. $R_1$ is preferably vinyl and $R_2$ is preferably a methyl group.

A third class of suitable organosilanes has the general formula $R_1R_2Si(OOCR_2)_2$ or $R_1Si(OOCR_2)_3$, wherein $R_1$ is selected from the group consisting of alkyl radicals having 1 to 8 carbon atoms, phenyl radicals, alkenyl radicals having 2 to 8 carbon atoms, and fluoroalkyl radicals having 3 to 8 carbon atoms, and $R_2$ is selected from the group consisting of alkyl radicals having 1 to 8 carbon atoms.

The carboxylic acid and organosilane surface modifiers together constitute about 0.5 to 5 wt % of the filler. The weight ratio of carboxylic acid component to organosilane component may vary from about 3:1 to 1:3. Preferably, the carboxylic acid and organosilane each comprise about 0.5 to 2.0% of the weight of the filler.

Compositions comprising about 1 wt % isostearic acid and about 1 wt % vinyl-tris (2-methoxyethoxy) silane are particularly preferred.

The surface modified inorganic filler is blended with a thermoplastic resin to form a filled thermoplastic resin compound. Suitable resins are polyethylene, polypropylene, polyvinyl chloride and mixtures and copolymers thereof. Polypropylene homopolymers, polypropylene copolymers and mixtures thereof are particularly preferred. About 100 parts by weight of the resin are mixed with up to about 190 parts by weight of the coated filler to form a filled thermoplastic compound.

The filled thermoplastic compound may be blended with a solid mixture of $C_{14}$–$C_{20}$ carboxylic acids to improve processing characteristics. The solid fatty acid mixture has an iodine value of about 15 or less. A preferred solid fatty acid mixture comprises about 40 to 50% by weight stearic acid and about 45 to 55% by weight palmitic acid. A particularly preferred solid mixture comprising 50 wt % palmitic acid, 45.5 wt % stearic acid, and remainder other $C_{14}$ to $C_{20}$ saturated fatty acids, has a titer (congealing point) of about 55 to 55.5° C. The solid fatty acid mixture comprises about 0.5 to 2.5% of the weight of the filler, preferably about 1.0 to 2.0%.

BRIEF DESCRIPTION OF THE DRAWING

The sole Figure is a photograph showing an injection molded thermoplastic compound with visible mold flow lines.

DETAILED DESCRIPTION OF A PREFERRED EMBODIMENT

The present invention is aimed at avoiding formation of mold flow lines in injection molded, filled thermoplastic compounds. A prior art injection molded polypropylene compound filled with alumina is shown in FIG. 1. Mold flow lines are readily visible.

The formation of mold flow lines in filled thermoplastic compounds is understandable because water is liberated from alumina trihydrate at 218° C. (425° F.) and polypropylene compounds are injection molded at approximately 177° C. (350° F.). Mold flow lines are generally thought to occur because localized overheating during the molding operation liberates water from the trihydrate. The combination of carboxylic acid and organosilane surface modifiers utilized in the present invention has been found to result in fewer mold flow lines and better surface appearance of the injection molded compounds than when comparable quantities of either surface modifier are employed alone.

In a preferred embodiment of the invention, a powdered inorganic filler is first provided with a surface coating of a liquid mixture of saturated $C_{14}$–$C_{20}$ carboxylic acids. The filler is preferably alumina hydrate but may also be other filler material available in particulate form, such as bauxite, hydrated magnesia, hydrated calcium silicate, kaolin, mica, talc and silica. A particularly preferred filler comprises alumina hydrate surface coated with 1.0 wt % isostearic acid. The particularly preferred surface modified alumina hydrate composition is sold under the trade name "Lubral 710" by Aluminum Company of America, Pittsburgh, Pa. Some additional properties of the particularly preferred surface modified alumina hydrate composition are set forth in Bonsignore U.S. Pat. No. 4,283,316, the disclosure of which is incorporated herein by reference to the extent not inconsistent with the present invention.

Surprisingly, it has been discovered that the appearance of filled thermoplastic compounds made with the inorganic filler described above can be improved by adding to the surface modified filler composition an organosilane compound. It is also surprising that properties of such filled compounds are better when alumina hydrate is first surface coated with isostearic acid and then treated with the organosilane than when an organosilane is applied to the hydrate prior to the isostearic acid. Although the precise mechanism of action for the present invention is unknown, the fact that order of treatment is important suggests that the saturated carboxylic acid and organosilane each react chemically with surface portions of the filler.

A particularly preferred organosilane is vinyl-tris (2-methoxyethoxy) silane, which is sold by Union Carbide Corporation under the trade designation "A172". Other suitable organosilanes are an organosilane ester sold by Union Carbide Corporation under the trade designation "Y9761" and a methyl vinyl siloxane fluid sold by Union Carbide Corporation under the trade designation "A1751".

A filled thermoplastic compound is made by blending the isostearic acid coated alumina hydrate with the organosilane and then combining the surface treated hydrate with resin in an intensive mixer. A particularly preferred thermoplastic resin is a blend of Hercules 7823 copolymer polypropylene and Hercules 6523 homopolymer polypropylene in a 1:1 ratio.

A solid mixture of $C_{14}$–$C_{20}$ carboxylic acids may be added to the filled compound to improve processing characteristics. The solid mixture of $C_{14}$–$C_{20}$ carboxylic acids has a titer of about 30° to 70° C. and an iodine value of about 15 or less. The mixture preferably comprises about 40 to 50 wt % stearic acid, about 45 to 55 wt % palmitic acid, remainder other saturated $C_{14}$ to $C_{20}$ fatty acids. A particularly preferred solid fatty acid mixture is sold under the trade name "Emersol 132" by Emery Industries, Inc. of Cincinnati, Ohio. Some additional details of the particularly preferred solid mixture of carboxylic acids are set forth in Levendusky et al U.S. Pat. No. 4,390,653, the disclosure of which is incorporated herein by reference to the extent not inconsistent with the present invention.

Some examples of filled thermoplastic compounds made in accordance with the present invention are summarized in Table I. Seven different sets of samples of Hydral 710 alumina trihydrate were incorporated into a polymer blend made from Hercules 7823 polypropylene copolymer and Hercules 6523 polypropylene homopolymer. Each set of samples was compounded both with and without 1% by weight of Emersol 132 solid fatty acids. Each formulation comprises about 61–62 wt % surface treated alumina trihydrate and about 38–39 wt % polymer blend. The formulations were compounded on a two-roll mill and test specimens were fabricated by injection molding. In Table I, the term "Lubral" designates isostearic acid; the term "E132" stands for Emersol 132 solid fatty acids; "A172", "Y9761" and "A1751" are each Union Carbide's designations for various organosilane compounds; and "H710" refers to Hydral 710 alumina trihydrate.

The filled specimens in Table I made with a combination of carboxylic acid and organosilane surface modifiers (Samples CC-7B, 94-8, 94-10, 94-11 and 94-12) all displayed better surface appearance than specimens containing only a single surface modifier (Samples CC-7A, DD-17B, DD-22A, DD-22B, 94-3, 94-4, 94-7 and 94-9) or no surface modifier (Sample DD-17A). Of all the filled specimens tested, Sample 94-12 exhibited the best surface appearance. In addition, Samples CC-7B, 94-8, 94-10, 94-11, and 94-12 all had good dynamic impact strength, notched impact strength and melt index properties.

Another advantage of using a combination of surface modifiers is the effect on mold flow properties. Samples CC-7A and DD-22A, each employing only a single surface modifier, both displayed unsatisfactory mold filling because of their low melt indexes. In contrast, all five specimens containing a combination of carboxylic acid and organosilane surface modifiers had satisfactory mold indexes.

TABLE I
EVALUATION OF SURFACE TREATMENTS ON ALUMINA TRIHYDRATE
Effect on Flow and Impact Properties

| Sample No. | Composition | Dynamic Impact Max Load* (lbs) | Dynamic Impact Total Energy (ft-lbs) | Melt Index** (g/10 min) | Notched Izod Impact (ft-lb/in) |
|---|---|---|---|---|---|
| Resin Control | 1:1 blend 7823/6523 Polypropylene (No added alumina) | 676.4 ± 80.2 | 17.19 ± 5.90 | 13.92 | 1.75 |
| DD-17A | H710 only | 343.1 ± 35.1 | 10.20 ± 0.20 | 0.30 | 0.55 |
| DD-17B | H710 + 1% w/w E132 | 360.0 ± 21.4 | 7.80 ± 2.40 | 3.74 | 1.04 |
| DD-22A | H710 + 1% w/w Lubral | 509.7 ± 11.9 | 16.5 ± 4.80 | 2.97 | 2.91 |
| DD-22B | D22A + 1% w/w E132 | 434.2 ± 34.2 | 8.8 ± 0.50 | 6.69 | 1.85 |
| CC-7A | H710 + 1% w/w A172 | 400.3*** | 9.80*** | 0.81 | 0.54 |
| CC-7B | CC7A + 1% w/w E132 | 402.3 ± 5.5 | 8.90 ± 2.20 | 7.00 | 0.96 |
| 94-3 | H710 + 2% w/w Lubral | 477.8 ± 10.8 | 12.23 ± 4.48 | 20.58 | 1.87 |
| 94-4 | 94-3 + 1% w/w E132 | 437.4 ± 27.4 | 8.27 ± 1.32 | 20.97 | 1.39 |
| 94-7 | H710 + (1% w/w Y9761/A1751) | 341.8 ± 7.1 | 6.80 ± 0.10 | 3.70 | 0.60 |
| 94-8 | 94-7 + 1% w/w E132 | 358.7 ± 1.1 | 8.58 ± 1.43 | 11.10 | 1.06 |
| 94-9 | H710 + 1% w/w A1751 | 335.9 ± 33.9 | 6.87 ± 0.34 | 4.02 | 0.63 |
| 94-10 | 94-9 + 1% w/w E132 | 483.0 ± 6.9 | 13.06 ± 5.37 | 12.18 | 1.48 |
| 94-11 | H710/(1% Lubral/1% A172) | 412.0 ± 17.1 | 8.00 ± 0.22 | 6.27 | 1.84 |
| 94-12 | 94-11 + 1% w/w E132 | 462.8 ± 30.7 | 9.16 ± 1.23 | 16.41 | 2.39 |

*12-in. drop height (Impact Velocity = 7.4 ft/sec)
**Condition N: 190° C. - 10,000 g load
***7-in. drop height (Impact Velocity = 5.8 ft/sec) only sample available

TABLE II
EVALUATION OF ORDER OF MIXING ON FLOW AND IMPACT PROPERTIES

| Sample No. | Composition (Order of Mixing) | Dynamic Impact Max. Load* (lbs) | Dynamic Impact Total Energy (ft-lbs) | Melt Index** (g/10 min) | Notched Izod Impact (ft-lb/in) |
|---|---|---|---|---|---|
| Resin Control | 1:1 blend 7823/6523 Polypropylene (No added alumina) | 676.4 | 17.19 | 13.92 | 1.75 |
| DD-30A | H710 + 1% w/w Lubral + 1% w/w A172 | 560.5 | 11.07 | 3.30 | 2.53 |
| DD-31A | H710 + 1% w/w A172 + 1% w/w Lubral | 423.8 | 7.15 | 1.16 | 0.78 |
| DD-30B | 30A + 1% w/w E132 | 470.7 | 8.06 | 5.67 | 2.26 |
| DD-31B | 31A + 1% w/w E132 | 503.9 | 8.47 | 5.34 | 1.43 |

*12-in. drop height (Impact Velocity = 7.4 ft/sec)
**Condition N: 190° C. - 10,000 g load The effect of order of mixing on properties of filled thermoplastic compounds is shown in Table II. Tests summarized in Table II were performed under the same conditions as the Table I tests. The same ingredients were used in Samples DD-30A and DD-31A. In Sample DD-30A isostearic acid was blended with alumina trihydrate prior to blending with the A172 organosilane and in Sample DD-31A the order of blending was reversed (i.e. the A172 organosilane was blended first and the isostearic acid second). Surprisingly, Sample DD-30A displayed better results than Sample DD-31A for all four properties tested.

These surprising results can possibly be explained by the fact that FTIR analyses of alumina coated with isostearic acid have shown chemical bonding between the acid and hydrate. Addition of an organosilane prior to the carboxylic acid appears to prevent such chemical bonding by allowing the silane to inhibit bonding between the acid and hydrate.

While the invention has been described in terms of preferred embodiments, the claims appended hereto are intended to encompass all embodiments which fall within the spirit of the invention.

What is claimed is:

1. A filler composition containing a combination of surface modifiers, said composition comprising
   (a) a powdered inorganic filler having a median particle size of less than about 15 microns, said filler being selected from the group consisting of alumina hydrate and bauxite, and
   (b) surface modifiers for the filler comprising
      (1) about 0.25 to 2.5 wt % of a mixture of saturated carboxylic acids consisting essentially of about 16 to 20 carbon atoms, said mixture having an iodine value of about 15 or less, and
      (2) about 0.25 to 2.5 wt % of an organosilane comprising
         (i) an organosilane of the formula

$R_n(SiX_{4-n})_b$ wherein R is selected from the group consisting of alkyl radicals containing 1 to 8 carbon atoms, alkenyl and alkynyl radicals containing 2 to 8 carbon atoms, and phenyl radicals, X is a hydrolyzable group; n=0 or 1; and b is at least 1 and not greater than 4, or (ii) an organosilane of the formula $R_1R_2Si(OR_2)_2$ or $R_1Si(OR_2)_3$ wherein $R_1$ is selected from the group consisting of alkyl radicals having 1 to 8 carbon atoms, phenyl radicals, alkenyl radicals having 2 to 8 carbon atoms, and fluoroalkyl radicals having 3 to 8 carbon atoms, and $R_2$ is selected from the group consisting of alkyl radicals having 1 to 8 carbon atoms, or (iii) an organosilane of the formula $R_1R_2Si(OOCR_2)_2$ or $R_1Si(OOCR_2)_3$ wherein $R_1$ and $R_2$ are defined above.

2. The filler composition of claim 1 wherein said organosilane comprises vinyl-tris (2-methoxyethoxy) silane.

3. The filler composition of claim 1 wherein said mixture comprises isostearic acid.

4. The filler composition of claim 1 wherein said inorganic filler comprises alumina hydrate having an average particle size of less than about 2 microns and said surface modifiers comprise vinyl-tris (2-methoxyethoxy) silane and isostearic acid.

5. The filler composition of claim 1 wherein said inorganic filler comprises alumina hydrate.

6. The filler composition of claim 5 wherein said alumina hydrate has an average particle size of less than about 7. The filler composition of claim 6 wherein the weight ratio of said carboxylic acid mixture to said organosilane is about 1:3 to 3:1.

8. The filler composition of claim 7 wherein the carboxylic acid and the organosilane each comprise about 0.5 to 2.0 wt % of the composition.

9. The filler composition of claim 1 wherein said mixture comprises a liquid mixture of $C_{16}$ to $C_{20}$ carboxylic acids having a titer below about 20° C., said liquid mixture being applied directly to the filler without a solvent.

* * * * *

UNITED STATES PATENT AND TRADEMARK OFFICE
CERTIFICATE OF CORRECTION

PATENT NO. : 4,711,673
DATED : December 8, 1987
INVENTOR(S) : Lawrence L. Musselman and Thomas L. Levendusky It is certified that error appears in the above-identified patent and that said Letters Patent is hereby corrected as shown below:

Claim 6, Col. 8, line 15     After "about" insert --2 microns--.

Signed and Sealed this

Fourteenth Day of June, 1988

Attest:

DONALD J. QUIGG

Attesting Officer

Commissioner of Patents and Trademarks